(12) United States Patent
Huloux

(10) Patent No.: US 6,195,398 B1
(45) Date of Patent: Feb. 27, 2001

(54) METHOD AND APPARATUS FOR CODING AND COMMUNICATING DATA IN NOISY ENVIRONMENT

(75) Inventor: Joel P. Huloux, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 08/994,921

(22) Filed: Dec. 19, 1997

(51) Int. Cl.[7] .................................................. H04K 1/02
(52) U.S. Cl. ............................................. 375/296; 375/349
(58) Field of Search ..................................... 375/130, 220, 375/222, 272, 259, 295, 296, 347, 349; 341/126, 173; 348/13, 392; 370/487; 704/206, 212

(56) References Cited

U.S. PATENT DOCUMENTS

| | | | |
|---|---|---|---|
| 4,048,443 | * | 9/1977 | Crochiere et al. ............... 704/206 |
| 4,322,739 | * | 3/1982 | Drewery et al. ................ 348/392 |
| 4,519,085 | | 5/1985 | Catros ................................. 375/27 |
| 4,612,653 | | 9/1986 | Livingston et al. ............... 375/23 |
| 4,661,945 | | 4/1987 | Hirosaki .............................. 370/20 |
| 4,743,967 | | 5/1988 | Takenaka et al. ............... 358/136 |
| 4,771,439 | | 9/1988 | Okazaki et al. .................... 375/27 |
| 4,984,211 | | 1/1991 | Tran ................................. 365/229 |
| 5,022,010 | | 6/1991 | Chan ............................ 365/230.06 |
| 5,061,901 | | 10/1991 | Nicollini et al. .................. 330/253 |
| 5,142,217 | | 8/1992 | Gontowski, Jr. ................. 323/272 |
| 5,184,027 | * | 2/1993 | Masuda et al. ................... 327/149 |
| 5,212,455 | | 5/1993 | Pernici et al. .................... 330/253 |
| 5,317,541 | | 5/1994 | Chan ............................ 365/230.06 |
| 5,332,937 | | 7/1994 | Castello et al. .................. 307/520 |
| 5,384,747 | | 1/1995 | Clohset ............................. 365/226 |
| 5,394,112 | | 2/1995 | Alini et al. ....................... 330/256 |
| 5,438,590 | * | 8/1995 | Tzukerman et al. ............. 375/259 |
| 5,517,148 | | 5/1996 | Yin .................................. 327/333 |
| 5,559,828 | * | 9/1996 | Armstrong et al. .............. 375/200 |
| 5,572,099 | | 11/1996 | Carobolante .................... 318/434 |
| 5,608,398 | | 3/1997 | Hashimoto et al. ................ 341/76 |
| 5,621,361 | | 4/1997 | Adduci .............................. 331/75 |
| 5,684,393 | | 11/1997 | Ryat ................................. 323/312 |

FOREIGN PATENT DOCUMENTS

2304199 * 3/1997 (GB) ............................. H04N/1/40

* cited by examiner

Primary Examiner—Stephen Chin
Assistant Examiner—Chieh M. Fan
(74) Attorney, Agent, or Firm—Theodore E. Galanthay; Lisa K. Jorgenson; Christopher Regan

(57) ABSTRACT

A method and an apparatus are provided for communicating data in noisy environments. A method preferably includes communicating a first fixed data signal at a first frequency on a first data communications line and communicating a second data signal at a second frequency on a second data communications line. The second frequency is preferably correlated to the first frequency by a predetermined coefficient so as to define a correlation value between the first and second data signals. The correlation value preferably represents a predetermined function. The method also preferably includes determining the correlation value responsive to the first and second data signals. The method can also advantageously include communicating a third data signal at the second frequency on the second data communications line. The third data signal is preferably phase shifted from the second data signal. The second frequency is also preferably the first frequency divided by the predetermined coefficient so as to define the same correlation value between the first and third data signals as the correlation value between the first and second data signals. The phase shift of the third data signal can also be representative of a different state of the control function represented by the correlation value.

46 Claims, 3 Drawing Sheets

METHOD AND APPARATUS FOR CODING AND COMMUNICATING DATA IN NOISY ENVIRONMENT

FIELD OF THE INVENTION

The invention relates to the field of data communication, and, more particularly, to communicating control data in noisy environmental conditions.

BACKGROUND OF THE INVENTION

Various data communication systems have been developed over the years for communicating data across data communications channels, networks, data lines, or other data links. As illustrated in FIG. 1, a persistent problem, however, is to communicate control data or control information from a first data communications device across a channel or data line to a second data communications device and from the second data communications device across the channel or data line to the first data communications device in noisy environmental conditions.

For example, as illustrated in FIG. 2, if information is sent across a data line. To have a function ON, then a clock signal is sent on the data line, and to have the function OFF, no signal is sent. In a noisy environment, noise can activate the control function in error.

To address this problem, as illustrated in FIG. 3, previous attempts have been made to send or transmit data on 2/3 lines. A first data line is for bit clock data, a second data line is for frame clock data, and a third data line is for control data or information. The data/control information is not correlated to or with the other data lines which are much more sensitive to noise. Increased or similar performance, e.g., little or no interference from the noise, and the required use of fewer data lines, however, remains desirable.

SUMMARY OF THE INVENTION

In view of the foregoing background, the present invention advantageously provides a method and apparatus for providing communication of data in noisy environmental conditions which is less sensitive to noise in the environment such as for applications related to computer networks, modems, control circuitry, or other types of data communication. The present invention also provides a method and apparatus requiring a reduced number of data lines or data channels for communicating data having a high degree of integrity in noisy environments. The present invention additionally provides a method and apparatus for communicating data across two data lines having a correlation between each of the two different signals being transmitted across the respective data lines.

More particularly, a method for communicating data preferably includes communicating a first fixed data signal at a first frequency on a first data communications line and communicating a second data signal at a second frequency on a second data communications line. The second frequency is preferably correlated to the first frequency by a predetermined coefficient so as to define a correlation value between the first and second data signals. For example, the second frequency can be the first frequency divided by the predetermined coefficient. The correlation value is also preferably representative of a predetermined function. The method preferably also includes determining the correlation value responsive to the first and second data signals.

Additionally, this method can also advantageously include communicating a third data signal at the second frequency on the second data communications line. The third data signal is preferably phase shifted from the second data signal. The second frequency is also preferably the first frequency divided by the predetermined coefficient so as to define the same correlation value between the first and third data signals as the correlation value between the first and second data signals. The phase shift of the third data signal can also be representative of a different state of the control function represented by the correlation value.

Another method of communicating data according to the present invention preferably includes transmitting a first data signal at a first frequency on a first data communications channel and transmitting a second data signal at a second frequency on a second data communications channel. The second frequency is preferably correlated to the first frequency by a predetermined coefficient so as to define a correlation value between the first and second data signals. The correlation value preferably represents a predetermined function. The method can also include receiving the first and second data signals and determining the correlation value responsive to the first and second data signals.

This method additionally can advantageously include transmitting a third data signal at the second frequency on the second data communications channel. The third data signal is preferably phase shifted from the second data signal. The second frequency also, for example, can advantageously be the first frequency divided by the predetermined coefficient so as to define the same correlation value between the first and third data signals. The phase shift of the third data signal preferably represents a different state of the predetermined function represented by the correlation value. The method can further include receiving the third data signal and determining the correlation value responsive to the first and third data signals.

Yet another method of coding data according to the present invention preferably includes encoding a first signal at a first frequency and encoding a second signal at a second frequency. The second frequency is preferably correlated to the first frequency by a predetermined coefficient so as to define a correlation value between the first and second data signals. The correlation value preferably represents a predetermined function.

This method can also advantageously include encoding a third signal at the second frequency. The third signal is preferably phase shifted from the second signal. The second frequency also is preferably correlated to the first frequency by the predetermined coefficient so as to define the same correlation value between the first and third signals as the first and second signals. The phase shift of the third signal preferably represents a different state of the predetermined function represented by the correlation value. The method can additionally include determining the correlation value responsive to the first, second, and third signals and determining the phase of the second and third signals responsive to the first, second and third signals.

A data communication apparatus for communicating data according to the present invention preferably includes a first data communication device for communicating data. The first data communication device includes transmitting means for transmitting a first signal at a first frequency, a second signal at a second frequency, and a third signal at the second frequency. The second frequency is preferably correlated to the first frequency by a predetermined coefficient so as to define a correlation value between the first and second signals. The correlation value preferably represents a predetermined function, e.g., a control function desired to be controlled. The third signal is preferably phase shifted from the second signal. The second frequency is also preferably correlated to the first frequency by the predetermined coefficient so as to define a correlation value between the first and third signals. The apparatus also includes a second data communication device responsive to the first data communication device. The second data communications device preferably includes receiving means responsive to the transmitting means of the first data communication device for receiving the first, second, and third signals.

The apparatus of the present invention can also advantageously include the first data communication device further including encoding means for encoding a first fixed data signal at a first frequency on a first data communications line, a second data signal at a second frequency on a second data communications line, and a third data signal at the second frequency on the second data communications line. The phase shift of the third signal also preferably represents a different state of the predetermined function represented by the correlation value. The second data communication device can further include decoding means responsive to the receiving means for decoding the first, second, and third signals. The decoding means preferably includes coefficient determining means for determining the predetermined coefficient responsive to the first and second signals and the first and third signals and phase discriminating means for discriminating the phase of the second and third signals responsive to the second and third signals.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
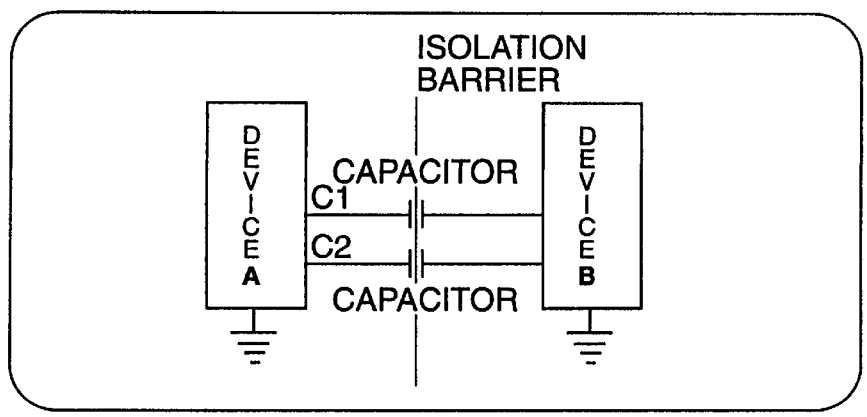
FIG. 1 is a schematic block diagram of a prior art data communications system.
Figure 2:
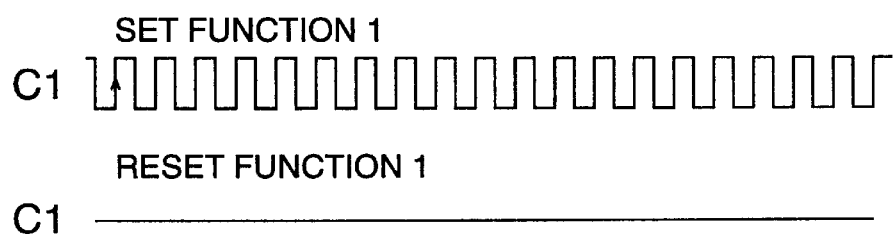
FIG. 2 is a graphical view of a prior art data coding scheme.
Figure 3:
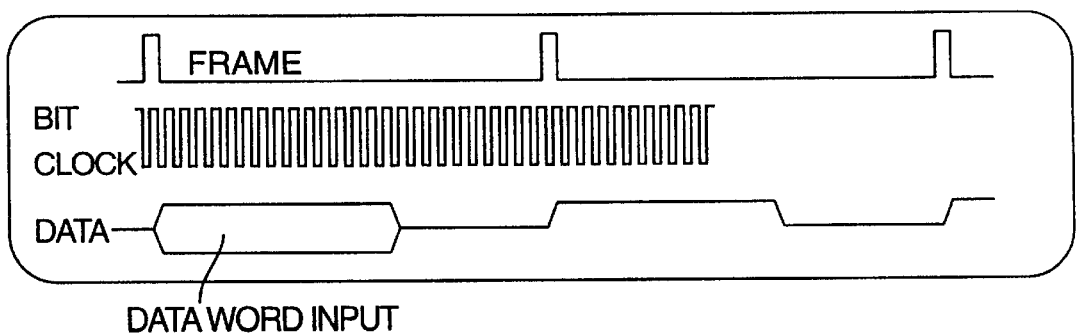
FIG. 3 is a graphical view of another prior art data coding scheme.
Figure 4:
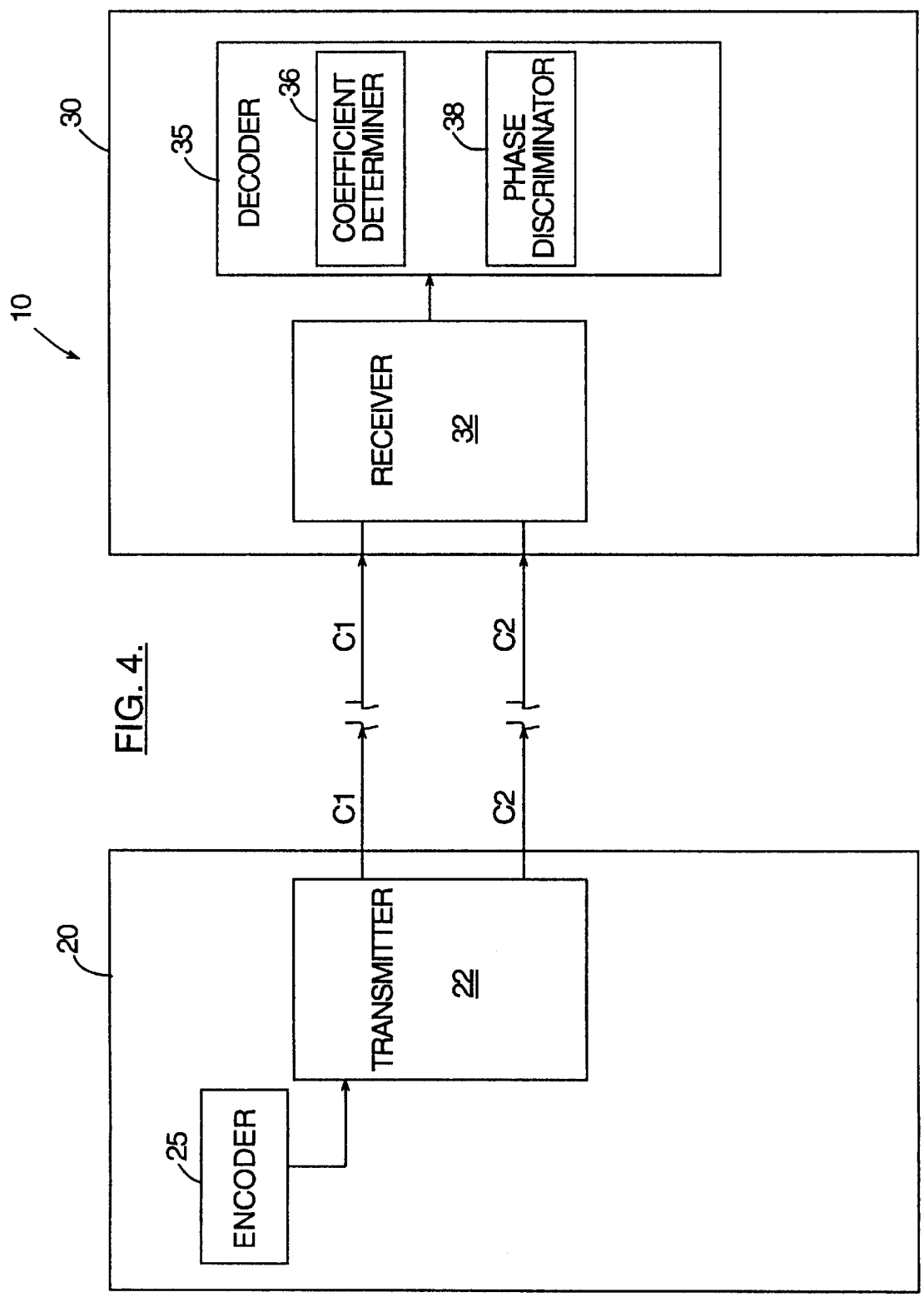
FIG. 4 is a schematic block diagram of a data communication apparatus having differential/phase coding for control in a noisy environment according to the present invention.

FIG. 4 schematically illustrates a data communication apparatus 10 for communicating data according to the present invention. The apparatus 10 preferably includes a first data communication device 20 for communicating data. The first data communication device 20 includes transmitting means, e.g., preferably provided by at least one transmitter 22 or a portion of a transceiver circuit as understood by those skilled in the art, for transmitting a first signal 12 at a first frequency F1, a second signal 14 at a second frequency F2, and a third signal 16 at the second frequency F2. As perhaps best illustrated in the examples of FIGS. 5–6, the second frequency F2 is preferably correlated to the first frequency F1 by a predetermined coefficient so as to define a correlation value between the first and second signals 12, 14. The correlation value preferably represents a predetermined function, e.g., a control function desired to be controlled. The third data signal 16 is also preferably phase shifted from the second signal 14. The second frequency F2 is also preferably correlated to the first frequency F1 by the predetermined coefficient so as to define a correlation value between the first and third signals 12, 16. The third data signal 16 is substantially the same as the second data signal 14 except for the phase shift between the second and third data signals 14, 16.

Figure 5:
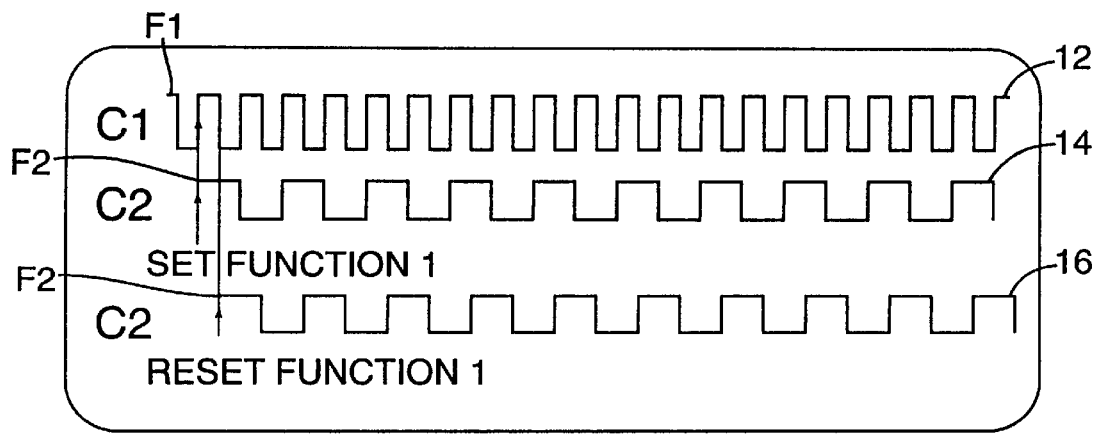
FIG. 5 is a graphical view of a method of communicating data in a noisy environment according to a first embodiment of the present invention.
Figure 6:
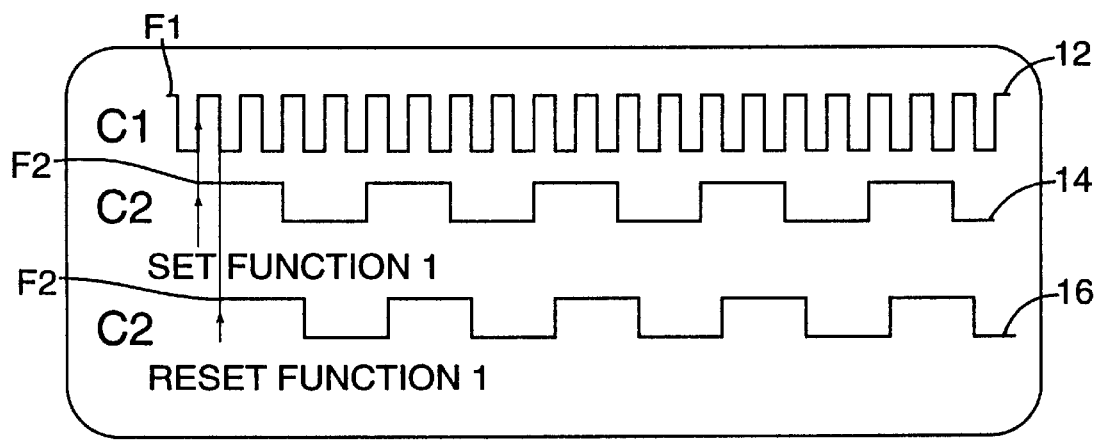
FIG. 6 is a graphical view of a method of communicating data in a noisy environment according to a second embodiment of the present invention.

The first frequency F1, for example, can be higher or greater than the second frequency F2, and, more preferably the first frequency F1 can be at least two times greater than the second frequency F2 (see FIGS. 5–6). Accordingly, if the second data signal 14 is correlated to the first data signal 12 by the second frequency F2 being a division of the first frequency F1 of the first fixed data signal 12 by the predetermined coefficient and the first frequency F1 is two times greater than the second frequency F2, then the predetermined coefficient can be 2. Likewise, if the first frequency F1 is four times greater than the second frequency F2, then the predetermined coefficient can be 4. This predetermined coefficient can either be the correlation value or be assigned a correlation value corresponding to this predetermined coefficient. The correlation value, or the predetermined coefficient, preferably then represents a desired predetermined control function such as set and reset, on and off, low and high, various ranges, or other predetermined functions which relate to a desired application to be controlled or for communicating therewith.

The first, second, and third data signals 12, 14, 16, for example, advantageously can be respective first, second, and third clock signals. The third signal 16 is preferably the same second clock signal shifted by a predetermined fraction cycle, e.g., a half cycle or a third cycle, of the first frequency F1. The second clock signal 14, for example, can trigger (i.e., rise and/or fall) responsive to the rising edge of the first clock signal 12, and the third clock signal 16 can also trigger (i.e., rise and/or fall) responsive to the falling edge of the first clock signal 12. It will be understood by those skilled in the art, however, that other triggering techniques can be used as well according to the present invention.

As described herein above with respect to the apparatus 10 and the methods described further herein, the correlation, for example, advantageously can be a frequency correlation for simplicity and reduced cost of more complex correlations. This technique can also be advantageously readily retrofitted or adapted in existing systems with a minimal amount of changes in hardware, software, and time requirements for the data communication. It will be understood by those skilled in the art, however, that other correlation schemes or techniques can be used as well according to the present invention.

The first data communication device 20 of the apparatus 10 further includes encoding means, e.g., preferably provided by a data encoder 25 which actually encodes the data or a software database or table which provides encoded data to the transmitter 22, for encoding a first fixed data signal 12 at a first frequency F1 on a first data communications line C1, a second data signal 14 at a second frequency F2 on a second data communications line C2, and a third data signal 16 at the second frequency F2 on the second data communications line C2. The phase shift of the third data signal 16 also preferably represents a different state of the predetermined function represented by the correlation value.

The apparatus 10 also includes a second data communication device 30 responsive to the first data communication device 20, e.g., positioned in communication therewith across first and second data communication lines or channels C1, C2. The second data communications device 30 preferably includes receiving means, e.g., preferably provided by at least one receiver 32 or a portion of a transceiver circuit as understood by those skilled in the art, responsive to the transmitter 22 of the first data communication device 20 for receiving the first, second, and third signals 12, 14, 16.

The second data communication device 30 also preferably includes decoding means, e.g., preferably provided by a decoder 35, responsive to the receiver 32 for decoding the first, second, and third data signals 12, 14, 16. The decoding means 35 preferably includes coefficient determining means, e.g., provided by a coefficient determiner 36 such as a circuit or software, for determining the predetermined coefficient responsive to the first and second signals 12, 14 and the first and third signals 12, 14 and phase discriminating means, e.g., provided by a phase discriminator 38 such as a circuit or software, for discriminating the phase of the second and third signals 14, 16 responsive to the second and third signals 14, 16.

As illustrated in FIGS. 1–6, the present invention also advantageously provides methods of coding and communicating data. A first method for communicating data preferably includes communicating a first fixed data signal 12 at a first frequency F1 on a first data communications line C1 and communicating a second data signal 14 at a second frequency F2 on a second data communications line C2. The second frequency F2 is preferably correlated to the first frequency F1 by a predetermined coefficient, e.g., 2 or 4, so as to define a correlation value between the first and second data signals 12, 14. For example, the second frequency F2 can be the first frequency F1 divided by the predetermined coefficient or vice-versa. The correlation value is also preferably representative of a predetermined function. The method preferably also includes determining the correlation value responsive to the first and second data signals 12, 14.

Additionally, the method can also advantageously include communicating a third data signal 16 at the second frequency F2 on the second data communications line C2. The third data signal 16 is advantageously phase shifted from the second data signal 14. The second frequency F2 is also preferably the first frequency F1 divided by the predetermined coefficient so as to define the same correlation value between the first and third data signals 12, 16 as the correlation value between the first and second data signals 12, 14. The phase shift of the third data signal 16 can also be representative of a different state of the control function represented by the correlation value.

Another method of communicating data according to the present invention preferably includes transmitting a first data signal 12 at a first frequency F1 on a first data communications channel C1 and transmitting a second data signal 14 at a second frequency F2 on a second data communications channel C2. The second frequency F2 is preferably correlated to the first frequency F1 by a predetermined coefficient so as to define a correlation value between the first and second data signals 12, 14. The correlation value preferably represents a predetermined function. The method can also include receiving the first and second data signals 12, 14 and determining the correlation value responsive to the first and second data signals 12, 14.

The method additionally can advantageously include transmitting a third data signal 16 at the second frequency F2 on the second data communications channel C2. The third data signal 16 is preferably phase shifted from the second data signal 14. The second frequency F2 also, for example, can advantageously be the first frequency F1 divided by the predetermined coefficient so as to define the same correlation value between the first and third data signals 12, 16. The phase shift of the third data signal 16 preferably represents a different state of the predetermined function represented by the correlation value. The method can further include receiving the third data signal 16 and determining the correlation value responsive to the first and third data signals 12, 16.

Yet another method of coding data according to the present invention preferably includes encoding a first signal 12 at a first frequency F1 and encoding a second signal 14 at a second frequency F2. The second signal 14 is preferably correlated to the first signal 12 by a predetermined coefficient so as to define a correlation value between the first and second data signals 12, 14. The correlation value preferably represents a predetermined function.

The method can also advantageously include encoding a third signal 16 at the second frequency F2. The third signal 16 is preferably phase shifted from the second signal 14. The second frequency F2 also is preferably correlated to the first frequency F1 by the predetermined coefficient so as to define the same correlation value between the first and third signals 12, 16 as the first and second signals 12, 14. The phase shift of the third signal 16 preferably represents a different state of the predetermined function represented by the correlation value. The method can additionally include determining the correlation value responsive to the first, second, and third signals 12, 14, 16 and determining the phase of the second and third signals 14, 16 responsive to at least the second and third signals 14, 16 and preferably also responsive to first, second and third signals 12, 14, 16.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A method of communicating control data in noisy environments comprising the steps of:

communicating a first fixed data signal at a first frequency on a first data communications line;

communicating a second data signal at a second frequency on a second data communications line, the second frequency being the first frequency divided by a predetermined coefficient so as to define a correlation value between the first and second data signals, the correlation value being representative of a control function controlled by the second data signal; and determining the correlation value responsive to the first and second data signals.

2. A method as defined in claim 1, further comprising:
communicating a third data signal at the second frequency on the second data communications line, the third data signal being phase shifted from the second data signal, the second frequency also being the first frequency divided by the predetermined coefficient so as to define the same correlation value between the first and third data signals as the correlation value between the first and second data signals, the phase shift of the third data signal being representative of a different state of the control function represented by the correlation value; and determining the correlation value responsive to the first and third data signals.

3. A method as defined in claim 2, wherein the step of communicating a first fixed data signal at a first frequency on a data line includes the steps of transmitting the first fixed data signal through a first data communication channel and receiving the fixed data signal through the first data communication channel, and wherein the step of communicating a second data signal at a second frequency on a second data line includes the steps of transmitting the second data signal through a second data communication channel and receiving the second data signal through the second data communication channel, and the method further comprising determining the phase of the second data signal responsive to the first and second data signals.

4. A method as defined in claim 3, further comprising determining the phase of the third data signal responsive to the first and third data signals.

5. A method as defined in claim 4, wherein the third data signal is substantially the same as the second data signal except for the phase shift therebetween.

6. A method as defined in claim 5, wherein the first frequency is higher than the second frequency.

7. A method as defined in claim 6, wherein the first fixed data signal comprises a first clock signal, wherein the second data signal comprises a second clock signal, and wherein the third data signal comprises the same second clock signal shifted by a predetermined fraction cycle of the higher first frequency so as to define a third clock signal.

8. A method as defined in claim 7, wherein the first frequency is at least two times greater than the second frequency.

9. A method as defined in claim 8, wherein the second clock signal triggers on the rising edge of the first clock signal, and wherein the third clock signal triggers on the falling edge of the first clock signal.

10. A method of communicating data in noisy environments comprising the steps of:

transmitting a first data signal at a first frequency on a first data communications channel; and transmitting a second data signal at a second frequency on a second data communications channel, the second frequency being correlated to the first frequency by a predetermined coefficient so as to define a correlation value between the first and second data signals, the correlation value being representative of a predetermined function responsive to the second data signal.

11. A method as defined in claim 10, further comprising receiving the first and second data signals and determining the correlation value responsive to the first and second data signals.

12. A method as defined in claim 10, further comprising transmitting a third data signal at the second frequency on the second data communications channel, the third data signal being phase shifted from the second data signal, the second frequency also being the first frequency divided by the predetermined coefficient so as to define the same correlation value between the first and third data signals, the phase shift of the third data signal being representative of a different state of the predetermined function represented by the correlation value.

13. A method as defined in claim 12, further comprising receiving the third data signal and determining the correlation value responsive to the first and third data signals.

14. A method as defined in claim 11, further comprising determining the phase of the second data signal responsive to the first and second data signals.

15. A method as defined in claim 13, further comprising determining the phase of the third data signal responsive to the first and third data signals.

16. A method as defined in claim 15, wherein the third data signal is substantially the same as the second data signal except for the phase shift therebetween.

17. A method as defined in claim 10, wherein the first frequency is higher than the second frequency.

18. A method as defined in claim 12, wherein the first data signal comprises a first clock signal, wherein the second data signal comprises a second clock signal, and wherein the third data signal comprises the same second clock signal shifted by a predetermined fraction cycle of the first frequency so as to define a third clock signal.

19. A method as defined in claim 10, wherein the first frequency is at least two times greater than the second frequency.

20. A method as defined in claim 18, wherein the second clock signal triggers on the rising edge of the first clock signal, and wherein the third clock signal triggers on the falling edge of the first clock signal.

21. A method of coding data for noisy environments comprising the steps of:

encoding a first signal at a first frequency;

encoding a second signal at a second frequency, the second frequency being correlated to the first frequency by a predetermined coefficient so as to define a correlation value between the first and second data signals, the correlation value being representative of a predetermined function to be controlled by the second signal; and determining the correlation value responsive to the first and second signals.

22. A method as defined in claim 21, further comprising encoding a third signal at the second frequency, the third signal being phase shifted from the second signal, the second frequency also being the first frequency divided by the predetermined coefficient so as to define the same correlation value between the first and third signals, the phase shift of the third signal being representative of a different state of the predetermined function represented by the correlation value.

23. A method as defined in claim 22, further comprising determining the correlation value responsive to the first and third signals.

24. A method as defined in claim 23, further comprising determining the phase of the second signal responsive to the first and second signals.

25. A method as defined in claim 24, further comprising determining the phase of the third signal responsive to the first and third signals.

26. A method as defined in claim 25, wherein the third data signal is substantially the same as the second signal except for the phase shift therebetween.

27. A method as defined in claim 26, wherein the first frequency is higher than the second frequency.

28. A method as defined in claim 27, wherein the first signal comprises a first clock signal, wherein the second signal comprises a second clock signal, and wherein the third signal comprises the same second clock signal shifted by a predetermined fraction cycle of the first frequency so as to define a third clock signal.

29. A method as defined in claim 28, wherein the first frequency is at least two times greater than the second frequency.

30. A method as defined in claim 29, wherein the second clock signal triggers on the rising edge of the first clock signal, and wherein the third clock signal triggers on the falling edge of the first clock signal.

31. A data communication apparatus for communicating data in noisy environments, the apparatus comprising:

first and second data communications channels;

a first data communication device in communication with the first and second data communications channels for communicating control data, said first data communication device including encoding means for encoding a first data signal at a first frequency on the first data communications channel, a second data signal at a second frequency on the second data communications channel, and a third data signal at the second frequency on the second data communications channel, the second frequency being correlated to the first frequency by a predetermined coefficient so as to define a correlation value between the first and second data signals, the correlation value being representative of a predetermined function responsive to the second data signal, the third signal being phase shifted from the second signal, the second frequency also being the first frequency divided by the predetermined coefficient so as to define a correlation value between the first and third signals, the phase shift of the third signal being representative of a different state of the predetermined function represented by the correlation value and responsive to the third signal; and a second data communication device in communication with the first and second data communication channels for communicating control data to and from said first data communication device, said second data communications device including decoding means for decoding the first, second and third data signals, said decoding means including coefficient determining means for determining the predetermined coefficient responsive to the first and second data signals and the first and third data signals and phase discriminating means for discriminating the phase of the second and third data signals responsive to the second and third data signals.

32. An apparatus as defined in claim 31, wherein said first data communication device includes at least one transmitter for transmitting the first, second, and third data signals across the first and second data communication channels, and wherein the second data communication device includes at least one receiver for receiving the first, second, and third data signals from the first and second data communication channels.

33. An apparatus as defined in claim 32, wherein the third data signal is substantially the same as the second data signal except for the phase shift therebetween.

34. An apparatus as defined in claim 33, wherein the first frequency is higher than the second frequency.

35. An apparatus as defined in claim 34, wherein the first data signal comprises a first clock signal, wherein the second data signal comprises a second clock signal, and wherein the third data signal comprises the same second clock signal shifted by a predetermined fraction cycle of the first frequency so as to define a third clock signal.

36. An apparatus as defined in claim 35, wherein the first frequency is at least two times greater than the second frequency.

37. An apparatus as defined in claim 36, wherein the second clock signal triggers on the rising edge of the first clock signal, and wherein the third clock signal triggers on the falling edge of the first clock signal.

38. A data communication apparatus for communicating data in noisy environments, the apparatus comprising:

a first data communication device for communicating data, said first data communication device including transmitting means for transmitting a first signal at a first frequency, a second signal at a second frequency, and a third signal at the second frequency, the second frequency being correlated to the first frequency by a predetermined coefficient so as to define a correlation value between the first and second signals, the correlation value being representative of a predetermined function responsive to the second signal, the third signal being phase shifted from the second signal, the second frequency also being correlated to the first frequency by the predetermined coefficient so as to define a correlation value between the first and third signals; and a second data communication device responsive to said first data communication device, said second data communications device including receiving means responsive to said transmitting means of said first data communication device for receiving the first, second, and third signals.

39. An apparatus as defined in claim 38, wherein said first data communication device further includes encoding means connected to said transmitting means for encoding a first fixed data signal at a first frequency on a first data communications line, a second data signal at a second frequency on a second data communications line, and a third data signal at the second frequency on the second data communications line, and wherein the phase shift of the third signal represents a different state of the predetermined function represented by the correlation value.

40. An apparatus as defined in claim 38, wherein said second data communication device further includes decoding means responsive to said receiving means for decoding the first, second, and third signals, said decoding means including coefficient determining means for determining the predetermined coefficient responsive to the first and second signals and the first and third signals and phase discriminating means for discriminating the phase of the second and third signals responsive to the second and third signals.

41. An apparatus as defined in claim 38, wherein said transmitting means of said first data communication device includes at least one transmitter for transmitting the first, second, and third signals across first and second data communication lines, and wherein said receiving means of said second data communication device includes at least one receiver for receiving the first, second, and third signals from the first and second data communication lines.

42. An apparatus as defined in claim 38, wherein the third signal is substantially the same as the second signal except for the phase shift therebetween.

43. An apparatus as defined in claim 38, wherein the first frequency is higher than the second frequency.

44. An apparatus as defined in claim 38, wherein the first frequency is at least two times greater than the second frequency.

45. An apparatus as defined in claim 38, wherein the first signal comprises a first clock signal, wherein the second signal comprises a second clock signal, and wherein the third signal comprises the same second clock signal shifted by a predetermined fraction cycle of the first frequency so as to define a third clock signal.

46. An apparatus as defined in claim 45, wherein the second clock signal triggers on the rising edge of the first clock signal, and wherein the third clock signal triggers on the falling edge of the first clock signal.

* * * * *